March 23, 1948. J. E. DICKMAN 2,438,333
MOTION PICTURE PROJECTOR ADAPTER FOR SHOWING STILL PICTURES
Filed Aug. 20, 1945 2 Sheets-Sheet 2
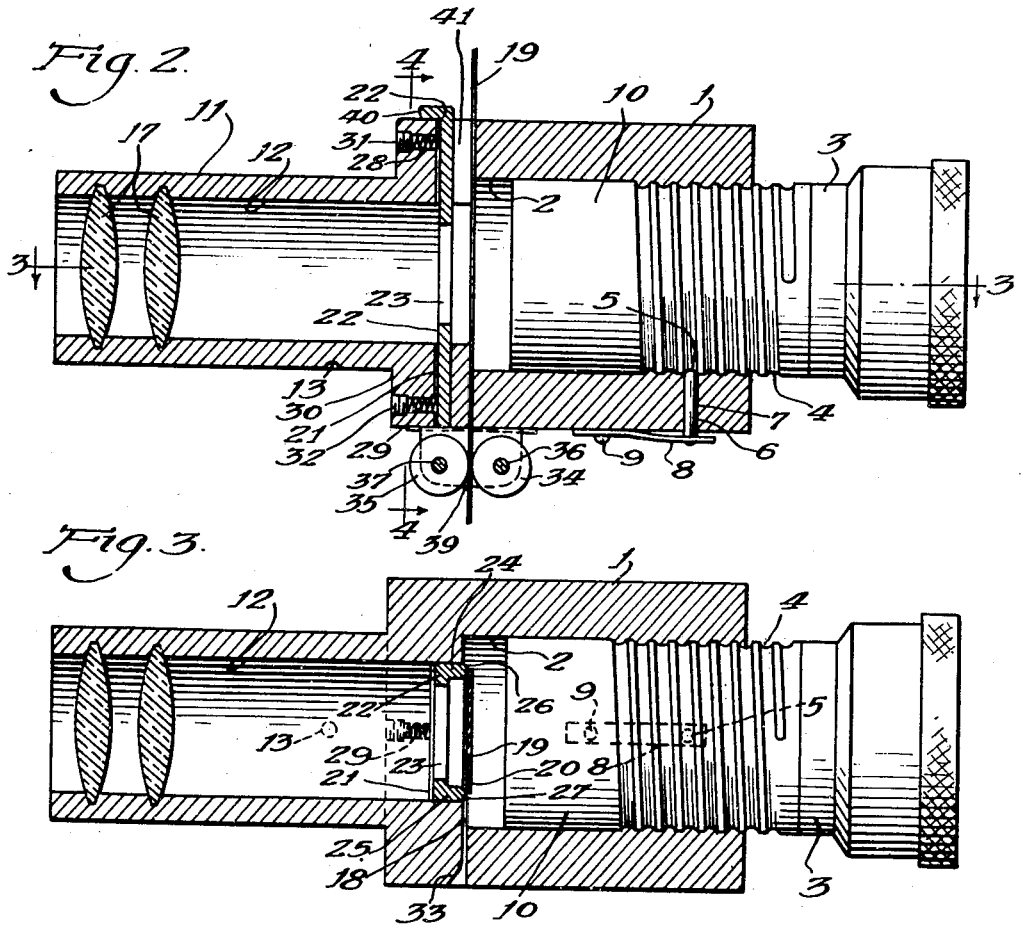
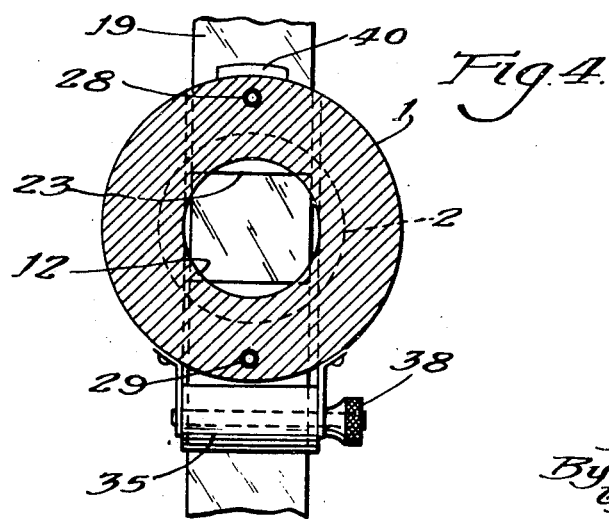
Inventor:
Joseph E. Dickman Patented Mar. 23, 1948

2,438,333

UNITED STATES PATENT OFFICE 2,438,333

MOTION-PICTURE PROJECTOR ADAPTER FOR SHOWING STILL PICTURES

Joseph E. Dickman, Chicago, Ill.

Application August 20, 1945, Serial No. 611,504

4 Claims. (Cl. 88—28)

This invention relates to a motion picture projector adapter for showing still pictures in which still pictures may be shown in a motion picture projector without damage to the film regardless of the length of time the still picture may be shown.

As is well known, in the projection of motion pictures from a motion picture projector, if the motion of the film is stopped and the film is permitted to remain stationary even for a second or less without the fire shutter in proper position, the particular panel of the film directly in front of the light projecting tube, will be injured or destroyed due to the heat from the light source. In the present invention I have eliminated this difficulty by providing an adapter which will be removably mounted in the outer end of the light projecting tube, after the adjustable lens has been removed therefrom, after which the adjustable lens may be adjustably mounted in the outer end of the adapter, and the moving picture film passed through the adapter and safely stopped for any desired length of time while a still picture is being shown through any desired panel of the film.

Among the objects of the present invention are: to provide a novel and improved motion picture projector adapter for showing still pictures; to make possible the showing of projected still pictures with the use of a standard motion picture projector without burning or scorching the film, or having the amount of light diminished by use of such devices as fire screens or the like; to provide an adapter of the type referred to, which is economical both as to the use of the adapter which eliminates the need of a second projector, as well as making possible the use of more economical raw stock for projection of 16 mm. films instead of 35 mm. films; to enable still pictures to be drawn from standard motion picture films by removing the film from the regular threading channel and inserting it in the adapter; and such further objects, advantages and capabilities, inherently possessed by my invention, as will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:

Fig. 1 is a side elevation of a motion picture projector showing my adapter applied thereto.

Fig. 2 is an enlarged longitudinal, vertical, central section of my adapter, and showing the focusing lens in elevation.

Fig. 3 is an enlarged longitudinal, horizontal, central section, taken on the line 3—3 of Fig. 2, but showing the focusing lens in elevation.

Fig. 4 is an enlarged vertical, transverse section, taken on the line 4—4 of Fig. 2.

Referring more in detail to the drawings, my adapter comprises a tubular body portion 1 having a central, longitudinally extending, cylindrical bore 2 adapted to adjustably receive the focusing lens member 3 which is of well known construction and is formed with the helical groove 4 for slidably receiving the semi-spherical end of the pin 6 in hole 7, which pin is slidably urged inwardly by spring 8 secured at one end to the body portion by a screw, pin, or the like 9. The upper end of hole 7 is slightly less in diameter than pin 6 so as to prevent the pin from being pushed too far into bore 2 when the focusing lens member 3 is removed from the body portion, and yet extend a slight amount (slightly less than the radius of the pin) into the bore 2 so that when the focusing lens member is pushed straight into the bore, the end 5 of the pin will be depressed by the cylindrical end 10 of the focusing lens member until the groove 4 registers with the end 5 of the pin. The pin will then spring into the helical groove, after which, rotation of the focusing lens member will move it longitudinally in the bore of the body portion for focusing purposes.

The body portion 1 is provided with a rearwardly extending portion 11 having an inner cylindrical opening 12, and at its forward end on its bottom side with a spherical recess 13 to receive the round end of a pin 14 in the light projecting tube 15, pin 14 being urged inwardly by a spring 16, pin 14 and spring 16 being similar to pin 6 and spring 8 shown in Fig. 2 and described above in connection with the adapter. As will be understood, when the moving picture projector is in normal use the focusing lens member 3 will be in position in the tube 15 of the projector to enable focusing by rotation of the focusing lens member in a manner similar to that described above in connection with Figs. 2 and 3. Mounted at the desired position in the rearwardly extending tubular member 11 of the adapter are condensing lens members 17.

Formed in the body member 1 and extending laterally inwardly thereof to a point a suitable distance laterally inwardly beyond the vertical diameter of bore 2 is a slot 18 which as seen in Figs. 2 and 3 extends vertically through one side when in the slot, a pair of soft-faced rollers at one end of the slot between which the film is adapted to be gripped for movement through the slot when the rollers are rotated, a condenser lens in said tubular member near its inner end, and a spring pressed pin in the other end portion of the tubular member.

2. An adapter for showing still pictures in a motion picture projector, comprising a tubular member of a size at one end adapted to be removably inserted in the light projecting tube of a moving picture projector, and at its other end having an opening adapted to receive a focusing lens member, said tubular member having a transverse slot opening through one of its sides and extending laterally beyond the vertical diameter of the tubular member, said slot in one face having an enlargement for slidably receiving a film and in its other face having an enlargement for receiving a pressure plate, a pressure plate in said last mentioned enlargement, resilient means for urging the pressure plate toward the film when in the slot, a pair of rollers at one end of the slot between which the film is adapted to be gripped for movement through the slot when the rollers are rotated, a condenser lens in said tubular member near its inner end, and means in the outer end of the tubular member for enabling selective longitudinal adjustment of a focusing lens member therein.

3. The adapter for showing still pictures in a motion picture projector and adapted to be removably mounted in the light projecting tube of the projector when the focusing lens member has been removed therefrom, comprising an adapter tube having a rear extension of an outside diameter approximately that of the inside diameter of the light projecting tube and a forward extension of an inside diameter approximately that of the outside diameter of the focusing lens member of the motion picture projector, whereby the rear extension of the adapter may be placed in the light of the projecting tube of the motion picture projector and the focusing lens member positioned in the forward extension of the adapter, said forward extension having internal threads for receiving similar threads on the focusing lens member for longitudinal focusing adjustment of the latter, said adapter tube being formed with a transverse slot for receiving a moving picture film edgewise, and a pressure plate in said slot for yieldably gripping the film between the plate and the side of the slot to enable longitudinal movement of the film in the slot.

4. An adapter for showing still pictures in a motion picture projector without danger of injury to the film from heat, comprising a hollow body portion having a tubular rear extension adapted to be removably inserted in the light projecting tube of the projector when the focusing lens member has been removed therefrom and a tubular forward extension adapted to removably and adjustably receive a focusing lens member, the outside diameter of the rear extension being approximately that of the inside diameter of the forward extension so that the rear extension may replace the focusing lens member in the projector and the focusing lens member may be inserted in the forward extension, means in the forward extension enabling longitudinal focusing adjustment of the focusing lens member therein, said hollow body portion having a transverse slot for receiving a moving picture film edgewise for longitudinal movement of the film through the inner portion of the slot, said slot having an enlargement, a pressure plate in said enlargement, resilient means for urging the pressure plate against the film when the latter is in the slot, and manually operable means for pulling a film through the slot.

JOSEPH E. DICKMAN.

REFERENCES CITED

The following references are of record in the file of this patent:

UNITED STATES PATENTS

| Number | Name | Date |
|---|---|---|
| 1,150,350 | Dussaud | Aug. 17, 1915 |
| 1,548,573 | Ackley | Aug. 4, 1925 |
| 1,550,320 | Isbills | Aug. 18, 1925 |
| 1,636,647 | Patterson | July 19, 1927 |
| 1,640,694 | Deming | Aug. 30, 1927 |
| 1,649,646 | Badgley | Nov. 15, 1927 |
| 1,727,900 | Patterson | Sept. 10, 1929 |
| 2,144,209 | Vollenweider | Jan. 17, 1939 |
| 2,381,228 | Schmidt | Aug. 7, 1945 |

FOREIGN PATENTS

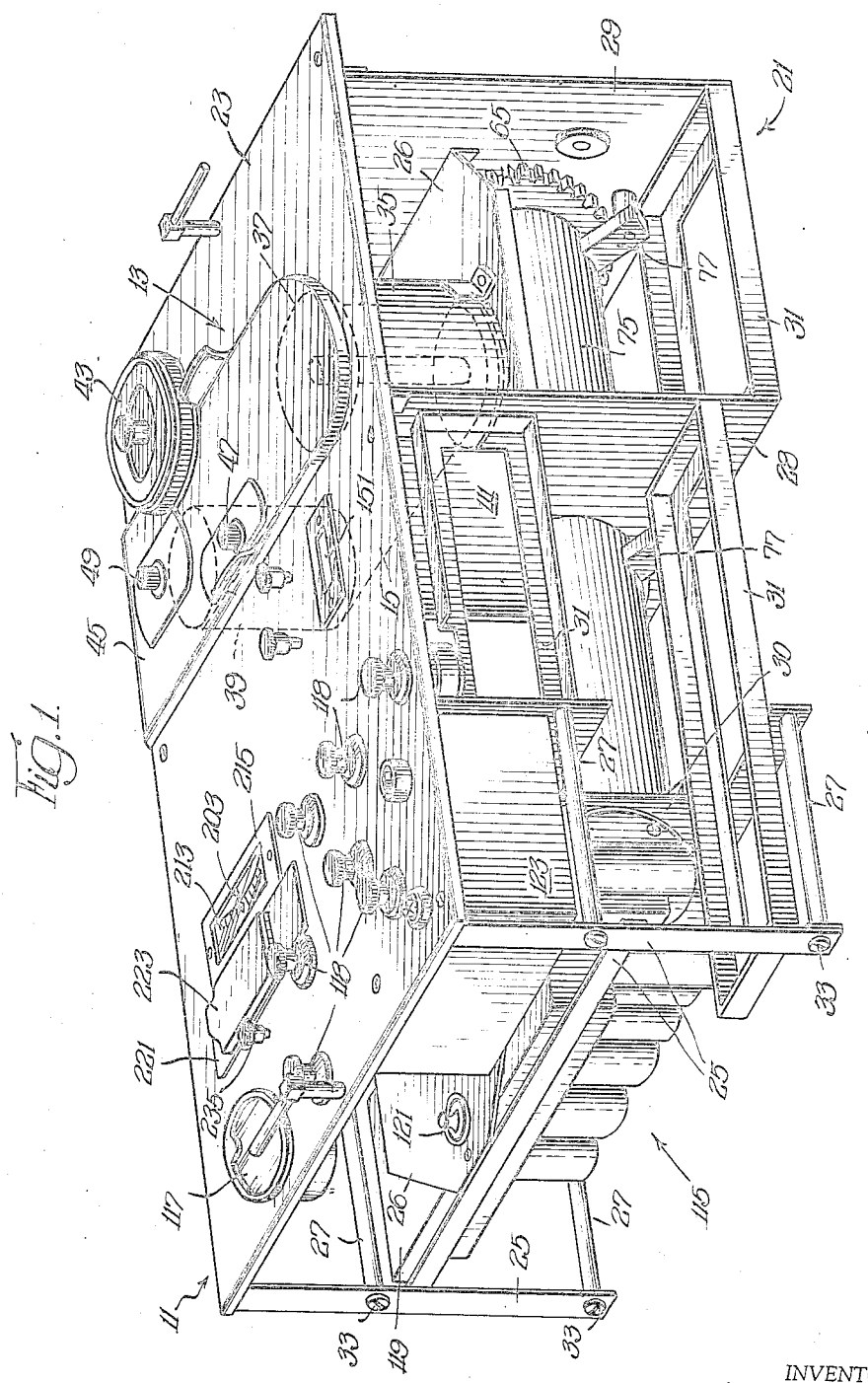

| Number | Country | Date |
|---|---|---|
| 525,110 | Great Britain | Aug. 21, 1940 |
| 646,903 | France | Nov. 17, 1928 |